(12) United States Patent
Gluck et al.

(10) Patent No.: US 10,334,101 B2
(45) Date of Patent: Jun. 25, 2019

(54) SYSTEM AND METHOD FOR GENERATING METADATA FOR A RECORDED SESSION

(71) Applicant: NICE Ltd., Ra'anana (IL)

(72) Inventors: Tal Gluck, Ra'anana (IL); Tal Zur, Rishon-Lezion (IL); Efim Kolodizner, Ashdod (IL)

(73) Assignee: NICE LTD., Ra'anana (IL)

( * ) Notice: Subject to any disclaimer, the term of this patent is extended or adjusted under 35 U.S.C. 154(b) by 756 days.

(21) Appl. No.: 13/899,580

(22) Filed: May 22, 2013

(65) Prior Publication Data

US 2014/0351256 A1 Nov. 27, 2014

(51) Int. Cl.
*G06F 16/00* (2019.01)
*H04M 3/42* (2006.01)
*G06F 16/68* (2019.01)
*H04M 3/523* (2006.01)

(52) U.S. Cl.
CPC ...... *H04M 3/42221* (2013.01); *G06F 16/686* (2019.01); *H04M 3/5232* (2013.01); *H04M 2203/301* (2013.01); *H04M 2203/408* (2013.01); *H04M 2203/551* (2013.01)

(58) Field of Classification Search
CPC ............ G06F 16/686; H04M 3/42221; H04M 2203/551; H04M 2203/301; H04M 2203/408; H04M 3/5232
See application file for complete search history.

(56) References Cited

U.S. PATENT DOCUMENTS

| | | | |
|---|---|---|---|
| 2009/0240818 A1* | 9/2009 | Hyndman | H04L 65/4015 709/228 |
| 2009/0274437 A1* | 11/2009 | Stiers | H04N 5/76 386/239 |
| 2011/0289220 A1* | 11/2011 | Henson | H04M 3/5116 709/227 |
| 2012/0254128 A1* | 10/2012 | Bath | G06F 17/30289 707/689 |
| 2013/0304777 A1* | 11/2013 | Bilinski | G06F 17/30749 707/828 |

* cited by examiner

*Primary Examiner* — Paul Kim
(74) *Attorney, Agent, or Firm* — Pearl Cohen Zedek Latzer Baratz LLP

(57) ABSTRACT

System and method for completing metadata for a recorded session. A recorder may initiate a recording of a session to produce a recorded session. The recorder may mark the recorded session as an incomplete or bad session. The session may be inserted into a bad sessions list. The bad sessions list may be examined and metadata related to sessions included therein may be used to update an operational database. Other embodiments are described and claimed.

17 Claims, 6 Drawing Sheets

| Field Type | Field Name | Field Description |
|---|---|---|
| Long | CallID | Call ID supply by the telephony switch |
| Long | CompoundID | |
| StreamDirection | Direction | Call direction (incoming/outgoing/internal) |
| String | DeviceNumber | Copied from previous related recording |
| Long | EndTime | End recording time |
| Long | InteractionID | ID supply by the controller |
| MediaType | MediaType | Recorded media (voice/screen) |
| Ulong | SessionID | Recording ID |
| Long | StartTime | Start recording time |
| Int | SwitchID | Telephony switch ID |
| String | UDI | Participant telephone ID |
| Int | UserID | The agent that participants in the call |

FIG. 5

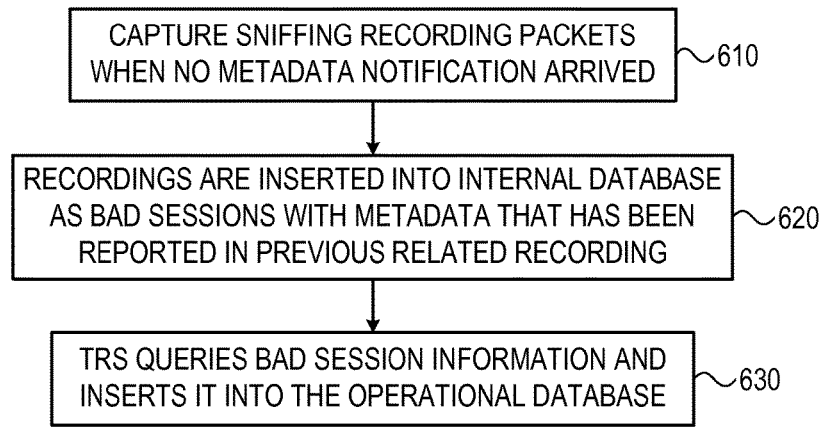

FIG. 6

SYSTEM AND METHOD FOR GENERATING METADATA FOR A RECORDED SESSION

FIELD OF THE INVENTION

The present invention pertains to recording, more particularly, to recording communications sessions such as telephone calls and other sessions.

BACKGROUND OF THE INVENTION

Sessions or communications sessions, e.g., telephone calls, are often recorded. For example, some or all calls to a contact center, bank or other organizations are recoded. A recording system is typically required to handle large amounts of data, in real-time. For example, to record a call, real time protocol (RTP) packets need to be captured and stored. In addition, in order for a recorded session to be usable, metadata data related to the recorded session may be generated and stored. Typically, a capturing unit is designed for real-time operations such as capturing and storing packets and an additional unit or controller handles metadata.

However, when a controller used for handling metadata is inoperative, or other events occur, metadata for recorded sessions may be incomplete. In order to complete or generate metadata for recorded sessions, large amounts of data are typically processed, e.g., in order to identify sessions for which no metadata exists. Accordingly, the task of completing metadata may be computational intensive. Moreover, an operational database can only be updated with metadata after a process of generating metadata is complete, accordingly, during possibly long periods of time, an operational database may not be up to date with respect to sessions in an organization.

SUMMARY OF EMBODIMENTS OF THE INVENTION

According to an embodiment, a method of completing metadata for a recorded session may include initiating, by a recorder, a recording of a session to produce a recorded session and marking, by the recorder, the recorded session as an incomplete session. If a message including metadata related to the session is received, then an embodiment may include marking the recorded session as a complete session. If no message including metadata related to the session is received then the method may include inserting into a list a reference to the recorded session. The method may further include examining the list to detect an entry related to the incomplete session and, based on the entry, storing in a database metadata related to the recorded session.

An embodiment may include generating, by the recorder, metadata for the recorded session based on metadata associated with a previous session. An embodiment may include generating metadata for the recorded session based on metadata associated with a previous session if a device associated with the previous session is associated with the recorded session. In an embodiment, examining the list and storing metadata in a database are performed periodically, by an inspection unit. In an embodiment, upon termination of a session, marking, by the recorder, the session as closed and an inspection unit is configured to only store metadata in the database for sessions marked as closed.

An embodiment may include generating, by the recorder, an incomplete metadata object for the recorded session and generating metadata for storing in the database based on the incomplete metadata object. A method of completing metadata for a recorded session may include automatically storing data related to a session to produce a recorded session by marking the session as a bad session and, if metadata for the session is unavailable then generating metadata for the session based on metadata related to a previous session. In an embodiment, automatically storing data related to a session is performed by a first module and wherein generating metadata for the session is performed by a second module.

A system for completing metadata for a recorded session may include a capturing unit configured to automatically initiate a recording of a session to produce a recorded session. The system may include a first module configured to mark the recorded session as an incomplete session; mark the recorded session as a valid or complete session if a message including metadata related to the session is received. In an embodiment, if no metadata for the session is available, the first module configured to, generate metadata for the session and, upon termination of the session, insert into a list a reference to the recorded session. In an embodiment, a second module included in the system is configured to examining the list to detect an entry related to the incomplete session, and store, in a database, metadata related to the recorded session.

In an embodiment, the first module is configured to generate metadata for the recorded session based on metadata associated with a previous session if a device associated with the previous session is associated with the recorded session. In an embodiment, the second module is configured to periodically examine the list and store metadata in a database. In an embodiment, the second module is configured to only store metadata in the database for sessions marked as closed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 5 shows an exemplary session structure according to embodiments of the invention;

FIG. 6 is a diagram of an exemplary flow according to embodiments of the present invention;

Figure 1:
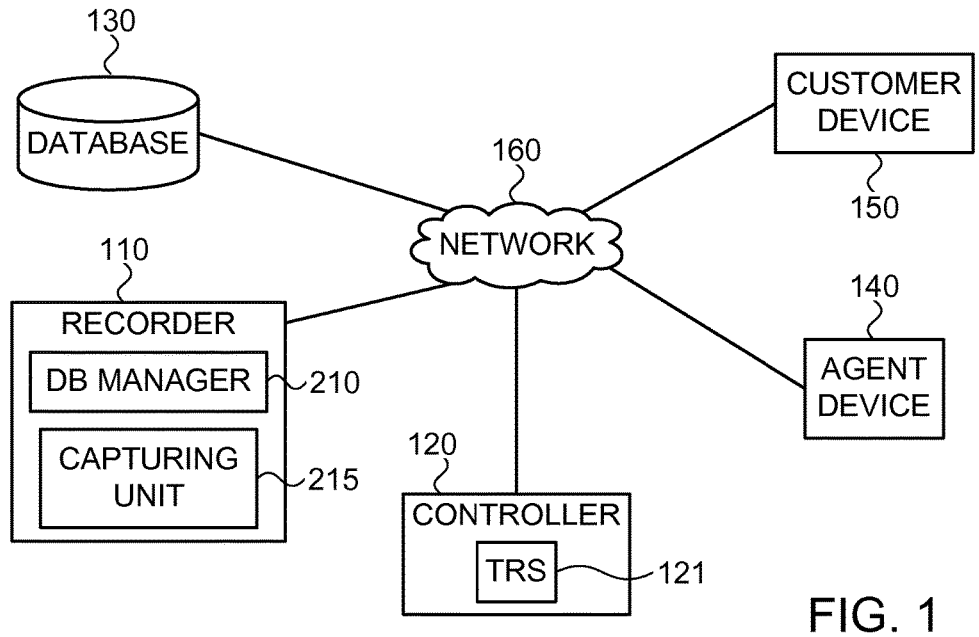
FIG. 1 shows an exemplary system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those having ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time or overlapping points in time. As known in the art, an execution of an executable code segment such as a function, task, sub-task or program may be referred to as execution of the function, program or other component.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Embodiments of the invention may enable maintaining or keeping an operational database up to date. For example, in a contact or call center, an operational database used for reviewing or replaying recorded sessions (e.g., communications sessions) may be periodically updated. In order to update an operational database, metadata (e.g., information describing, or other information) related to a session may be required. Typically, metadata is generated or obtained by a controller that is separate from the recorder and the controller sends or otherwise provides the metadata to the recorder. At the recorder, the metadata is associated with or connected to the relevant session (and/or recording of the session). The recorder (e.g., using a module in the recorder) may subsequently update the operational database using the metadata and the recorded session.

A problem may arise when or if the controller that provides the metadata is down, inoperative, disconnected or otherwise unavailable. In an embodiment, a recorder automatically starts recording a session when the session is established or when data for the session is available at the recorder. A module in the recorder determines whether or not a session is complete. Generally, a session is considered complete if metadata for the session is available at the recorder. If no metadata is available at the recorder, the session may be marked or labeled as an incomplete or bad session. If, after marking a session as bad or incomplete, metadata is found to be or becomes available (e.g., received from a controller) the marking may be reversed or changed and the session may be marked as complete or good. If a session marked as bad or incomplete ends or terminates, the session may be entered into a bad sessions list or table, or other data structure. The bad sessions list or table may be checked (e.g., periodically, based on a configuration parameter) and sessions included in the bad sessions list may be used for updating the operational database. As described, incomplete or bad sessions may be sessions for which no or not all metadata was received. In an embodiment, metadata for an incomplete session may be generated or created based on metadata of a previous session. For example, before updating an operational database to include a session, if the session is marked as an incomplete session, metadata data for the incomplete session may be generated by copying metadata from a previous session. Accordingly, a database may be made to include a session even if no metadata for the session was received, at or by, a recorder. In an embodiment, a previous session may be a session substantially immediately preceding the current session. For example, a previous session may be the session that terminated right before the current session was established. A previous session may be the session that took place right before the current session. As discussed, since a recording unit or module may be associated with an agent device, it is safe to assume that the same agent who handled the previous session is handling the current session, using the same agent device. Accordingly, an embodiment may use information such as an agent name obtained from a previous agent in order to complete metadata for a current session.

Figure 4:
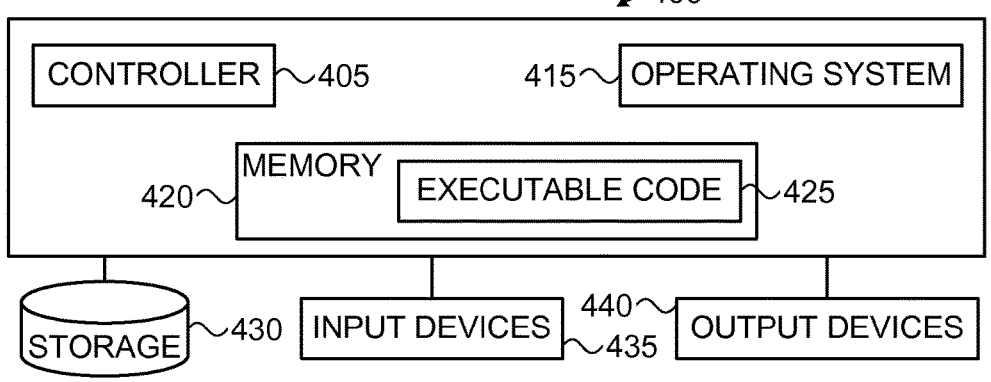
FIG. 4 shows a high level block diagram of an exemplary computing device according to embodiments of the present invention.

Reference is made to FIG. 1 that shows an exemplary system according to embodiments of the invention. As shown, a system may include a recorder 110, a controller 120 for controlling operation of recorder 110, a database 130 for storing data related to recorded sessions, an agent device 140, a caller or customer device 150 and a network 160. As further shown, controller 120 may include a total recording solution (TRS) module or unit 121 and recorder 110 may include a database (DB) manager 210 (DB manager 210 hereinafter) and a capturing unit 215. TRS 121, DB manager 210 and capturing unit 215 are further described herein. TRS 121 and DB manager 210 may be any suitable module or unit, e.g., a software module loaded in memory 420 and executed by controller 405 as shown by FIG. 4 and described in related text.

In an embodiment, capturing unit 215 automatically records a sessions when the session starts. For example, a session may be a telephone call. In an embodiment, DB manager 210 identifies bad sessions and marks bad sessions, e.g., inserts bad sessions into a bad session list or other data structure (e.g., a table, vector, etc.). Any applicable structure and/or method may be used to mark a session as a bad session or as a good session. For example, a session may be marked as a bad session by inserting the session (or a reference to the session) into a list of bad sessions. A session may be marked as a bad session by updating metadata associated with the session, e.g., as further described herein.

Generally, if no metadata is available for a session then the session may be marked, labeled or indicated as a bad session. If metadata for a session is available, the session may be marked, labeled or indicated as a good session. In an embodiment, if no metadata for a session is received by a recorder, a session may be marked, by the recorder, as a bad session when created, when established or even after the session terminates. In an embodiment, if metadata related to the session is received (e.g., received later, or after the session is marked as bad or incomplete) at the recorder then the session may be marked, by the recorder, as a good session; e.g., the marking may be changed, updated or reversed. Accordingly, sessions for which no metadata was received or otherwise made available may be marked or identified, by a recorder, as bad sessions.

In an embodiment, TRS 121 checks the bad session list (e.g., periodically or when a connection between controller 120 and recorder 110 is established or reestablished) and updates database 130 based on the bad sessions list. Accordingly, rather than searching all sessions recorded by recorder 110 to find bad sessions (e.g., in off-line or during hours of low activity), embodiments of the invention enable handling bad sessions in real-time or near real time, or continuously or periodically. For example, TRS 121 may check for bad sessions every two minutes. Handling bad sessions in real-time or near real time is enabled since, in order to identify bad sessions, TRS 121 needs not scan or examine all sessions recorded by recorder 110, but only check a bad sessions list.

In an embodiment, capturing unit 215 automatically starts or initiates a recording of a session and labels or marks the session as a bad session. If metadata for the session is received, capturing unit 215 marks the recorded session as a good session. Accordingly, in an embodiment, a session is marked, labeled or identified as a bad session if no metadata for the session is available to a recorder that records the session. In the embodiment, at any point in time, if metadata is received at the recorder (or otherwise made available to the recorder), the session is marked as a good session (e.g., the marking is changed or reversed). For example, in an embodiment, a bad session is a session that cannot be included in an operational database since no metadata for the session is available.

As discussed herein, in order to be usable, sessions in an operational database are associated with metadata in order to enable operations such as searching for a specific session, determining a duration of a session etc. Accordingly, if no metadata is available, a session may not be usable. Similarly, a good session as referred to herein may be a session for which metadata is available and may therefore be a usable session as described. The terms "bad session", "incomplete session" and "invalid sessions" may be used herein interchangeably to refer to a session for which no metadata is available at a recorder that records the session. Similarly, the terms "good session", "complete session" and/or "valid session" may be used herein interchangeably to refer to a session for which metadata is available at a recorder that records the session.

In an embodiment, a session is initially marked as a bad, invalid or incomplete session and, if metadata for the session is received, marked as a good, valid or complete session. In an embodiment, if no metadata is received for the session and the session terminates or ends, the session remains marked as a bad session. In an embodiment, metadata is generated, by a recorder, for bad sessions. For example, metadata for a bad session is generated based on metadata of a previous session as described herein. In an embodiment, after generating metadata for a bad session, an operational database is updated using the metadata generated by the recorder. In some embodiments, the initial marking as bad or incomplete may be a "default". In other embodiments, the initial marking as bad or incomplete may not be a "default", but may be based on some information or criteria that separates the session as bad from other sessions which are not bad. For example, a method may include automatically marking, by a recorded, a session as an incomplete session and only changing (or reversing) the marking of the session to a complete session if metadata for the session is received by the recorder.

Various embodiments may be realized. For example, a system may include a capturing unit configured to initiate a recording of a session to produce a recorded session (e.g., capturing unit 215). A system may include a first module configured to mark the recorded session as an incomplete session (e.g., DB manager 210). The first module may also be configured to mark the recorded session as a complete session if a message including metadata related to the session is received. Accordingly, a session marked as incomplete may be marked as complete instead of incomplete. Otherwise described, a marking of a session as incomplete may be reversed such that the session is marked as complete.

If no metadata for the session is available, the first module may also be configured to generate metadata for the session and insert into a bad sessions list a reference to the recorded session upon termination of the session. A system may include a second module configured to-examine the bad sessions list to detect an entry related to the incomplete session, and update, or store in, a database, metadata related to the session. For example, the second module may be the TRS 121 module described herein. For example, the first and second modules described herein may be software modules executed by a controller.

For example, controller 120 may be or may include a computing device similar to computing device 400 and the second module (TRS 121) may be a module included in executable code similar to executable code 425 executed by a controller similar to controller 405 included in controller 120. Similarly, the first module may be included in executable code similar to executable code 425 that may be executed by a controller similar to controller 405 included in recorder 110.

In an embodiment, DB manager 210 examines recorded sessions, e.g., based on a list of open sessions described herein. In an embodiment, DB manager 210 determines whether the session is completed or not. If the session is completed or terminated, DB manager 210 inserts the session into a closed sessions list or other data structure (e.g., a table, vector, etc.). In an embodiment, DB manager 210 determines whether or not the session is a bad session (e.g., no metadata for the session was received from controller 120). In an embodiment, DB manager 210 inserts bad sessions into a bad session list.

In an embodiment, TRS 121 checks a bad sessions list and updates database 130 based on the bad sessions list such that sessions included in the bad sessions list are represented in database 130 and are therefore usable. In other embodiments, other modules may be used and/or operations described herein may be distributed differently between described modules.

In a typical setup, recorder 110, controller 120, database 130, agent device and network 160 may be located within, or otherwise associated with, a contact center, an enterprise, a department of an organization; a unit or a location assigned a task of interacting with customers, clients or other entities.

In some embodiments, although associated with a contact center, agent device 140 may be physically located elsewhere, e.g., in a home of an agent, a service representative or an expert. Accordingly, although the discussion herein will mainly relate to a contact center, embodiments of the invention may be realized in other setups or configurations. For example, embodiments of the invention may be applicable to service representatives in an enterprise, employees in a bank assigned the task of interacting with customers, a department in an academic institution whose tasks include interacting with students or a department in a medical facility in charge of interacting with patients. For the sake of simplicity and clarity, a contact center will mainly be referred to herein, however, it will be understood that embodiments of the invention are not limited to a contact center and may be realized or applicable in other setups, scenarios or configurations.

For the sake of clarity and simplicity, only some of the components and/or devices in a possible setup are shown. For example, in a typical contact center employing a large number of agents or service representatives, a large number of devices such as agent device 140 may be deployed. In a typical setup, a very large number of customer or caller devices such as caller device 150 may be present or active, for example, a contact center may serve or interact with hundreds of customers operating customer devices such as customer device 150. Likewise, any number of recorders such as recorder 110 may be deployed, possibly with a required number of controllers 120. Accordingly, it will be realized that embodiments of the invention are not limited by the number of components shown in FIG. 1.

Agent device 140 may be any applicable device used by service representatives in an enterprise for interacting over a session with a customer. For example, a session may be a telephone call, a web or Internet communications session (e.g., a chat session or a document sharing session), a text based session, e.g. a short message service (SMS) session or an electronic mail (e-mail) session or it may be a web chat session, e.g., using a commercial online internet online chat application. For example, agent device 140 may be a telephone, an internet protocol (IP) enabled telephone, a smartphone or any device or system enabling an agent to talk to a customer or otherwise participate in a voice session.

Network 160 may be, may comprise or may be part of a private or public IP network, or the internet, or a combination thereof. Additionally or alternatively, network 160 may be, may comprise or may be part of a global system for mobile communications (GSM) network. For example, network 160 may include or comprise an IP network such as the internet, a GSM related network and any equipment for bridging or otherwise connecting such networks as known in the art. In addition, network 160 may be, may comprise or be part of an integrated services digital network (ISDN), a public switched telephone network (PSTN), a public or private data network, a local area network (LAN), a metropolitan area network (MAN), a wide area network (WAN), a satellite communication network, a cellular communication network, any combination of the preceding and/or any other suitable communication means. Accordingly, numerous elements of network 160 are implied but not shown, e.g., access points, base stations, communication satellites, GPS satellites, routers, telephone switches, etc. It will be recognized that embodiments of the invention are not limited by the nature of network 160.

A portion of network 160 may be internal to a contact center and another portion of network 160 may be external to a contact center. For example, a secured, internal portion of network 160 may include one or more private branch exchange (PBX) units used for routing calls to and from a contact center as known in the art. For the sake of simplicity, such possible portions are not shown, however, it will be understood that network 160 may be configured to enable any configuration or setup required. Communication between an agent, an expert and a customer over a public or global network may be enabled by a public or global network portion included in network 160. Suitable network devices such as switches, routers and firewalls may be included in network 160 to enable any required configuration, e.g., a separation of an internal and external networks or enabling devices that use wireless communication to communicate with devices using wired networks.

Caller device 150 may be a wireless or mobile telephone, a smartphone, a computer or any device that may be used by a customer or caller to call, or interact with, an agent or a contact center or interact with a remote computing or communication device. Controller 120 may be any suitable computing device, e.g., a server computer executing control tasks described further herein. Database 130 may be any suitable system for storing and retrieving data from storage. For example, database 130 may be a commercial database designed to store metadata related to interactions or sessions. Database 130 may be operatively connected to a storage system where actual session data (e.g., audio data) is stored. Accordingly, database 130 may enable using recorded sessions, e.g., replay a session, search for a specific session etc. Recorder 110 may be a unit configured to record sessions. For example, recorder 110 may record telephone calls between an agent using agent device 140 and a customer using caller device 150. Calls, sessions or interactions recorded by recorder 110 may be provided to database 130. For example, recorder 110 may store audio data related to a call on a disk and database 130 may access the disk, over network 160, and retrieve audio data therefrom.

Current recorders are devices specifically designed for real-time operation. For example, a recorder is a device designed for recording packets or other data at the rate the packets or data is received. Control data and metadata are often not available in real time, nor are they required to be handled in real-time. Accordingly, while a recorder handles the real-time aspect of recording data, a system may depend on an additional module, device or entity to handle control and metadata. For example, when operative, controller 120 may provide metadata to recorder 110. Typically, metadata is associated with the actual (or raw) data and stored in an operational database (e.g., database 130 that may be an operational database used for replaying recorded sessions). Otherwise described, the task of generating usable recorded sessions is shared by a recorder that handles real-time operations (e.g., storing raw data such as RTP packets on a disk) and a controller that handles control and metadata. For example, a controller may be connected to various elements in a network (e.g., a computer telephony integration (CTI) management system) and may obtain or receive metadata from such or other element. The controller may collect metadata and provide the metadata to the recorder that typically associates the metadata with the raw data, thus usable recordings are produced. A usable recorded session may include at least one file or other object that includes the actual or raw data and a metadata file or other object that includes relevant data, information or parameters. For example, metadata related to a session may include a reference to the file that contains the raw data, the file's name, length, type and other parameters. Metadata may include a reference to the agent who handled the call, a time parameter reflecting the time and date of the call, the length and the like. Metadata may include other or different data.

For example, in order for recorded sessions to be usable, database 130 is updated with metadata and a link or reference to the actual (or raw) data, e.g., the RTP packets recorded during a telephone call. Metadata stored in database 130 is used in order to search for recorded sessions, playback of recorded sessions and the like, therefore database 130 may also be referred to herein as an operational database.

For example, in an embodiment, recorder 110 is designed for real-time recording but is not designed or configured to support interaction with employees. For example, in order to listen to a recorded call, an agent in a contact center interacts with operational database 130 where metadata (and a link to raw data) is stored. Accordingly, after recording a session by recorder 110 database 130 must be updated. When controller 120 is operative, information (e.g., metadata) required in order to update database 130 is typically received from controller 120.

For example, when operative, controller 120 provides recorder 110 with CTI or other information such as an identification number of an interaction, an identification of a switch from which RTP packets are received, the type of media being carried in the RTP packets and information related to an agent handling a session. Using a reference provided by controller 120, or using other methods, recorder 110 associates metadata or other information received from controller 120 with the actual data (e.g., RTP packets including the audio of a conversation). After metadata is associated with the recorded data, it may be transferred or otherwise provided to database 130. Database 130 is typically accessed by personnel in an organization (e.g., a contact center) in order to replay or view recorded sessions. For example, search operations (e.g., searching for recorded session based on a criteria, e.g., date, length etc.) may be performed based on metadata in database 130. The actual data needed to replay or copy a recorded session (e.g., the RTP packets) may be stored separately from database 130, e.g., left on a storage used by recorder 110 that may be different from a storage used by database 130.

As described above, when controller 120 is operative, it provides recorder 110 with at least metadata related to a session or interaction. However, controller 120 may be inoperative. For example, due to a hardware failure or disconnection from network 160, controller 120 may be inoperative. In current recording systems, when a controller is unavailable, bad sessions are created on a recorder. Accordingly, at some point, all recorded sessions need to be examined in order to determine whether they are associated with, or include metadata, which is required in order for the recorded sessions to be usable. Typically, since the task of examining the recorded sessions is computationally intensive, it is performed in off-line (or offline), e.g., during off-peak hours. In contrast, an embodiment of the invention enables checking for bad sessions by checking a list that includes bad sessions but does not include all recorded sessions. Accordingly, according to embodiments of the invention, checking for existence of bad sessions on a recorder can be performed using minimal resources and may therefore be performed continuously or may be frequently repeated.

Figure 2:
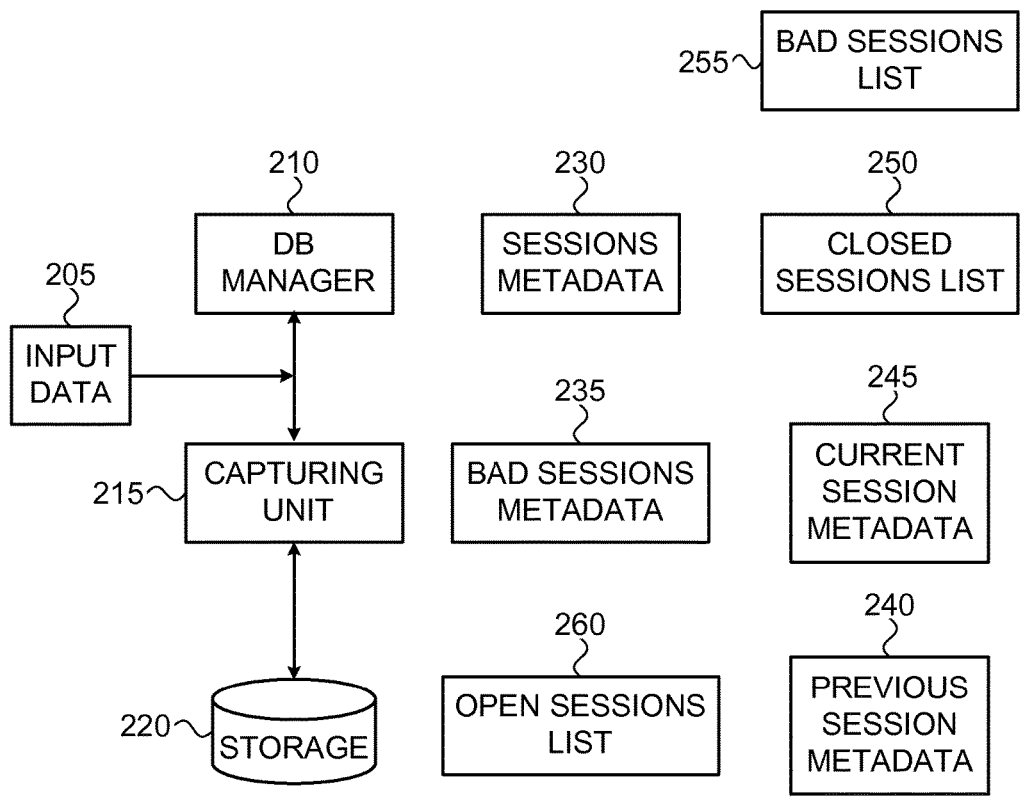
FIG. 2 shows a high level block diagram of components and structures included in a recorder according to embodiments of the present invention.

Reference is made to FIG. 2 which shows a high level block diagram of components and structures included in, and/or maintained by, a recorder according to embodiments of the present invention. For example, recorder 110 may include components, and maintain data structures shown in FIG. 2. As shown by input data 205, a recorder may receive input data. For example, input data 205 may include RTP packets containing audio information. Input data 205 may include control data. For example, computer telephony integration (CTI) data may be received by a recorder as shown by input data 205.

As shown, input data 205 may be provided to DB manager 210 and to capturing unit 215. It will be noted that not all input data needs to be provided to both DB manager 210 and to capturing unit 215. For example, RTP packets carrying a digital representation of audio data may be provided to capturing unit 215 but not to DB manager 210. Control information and/or metadata may be selectively provided to, or obtained (e.g., from input data 205) by DB manager 210 and capturing unit 215. For example, metadata from controller 120 may only be received by DB manager 210, thus relieving capturing unit 215 from handling messages from controller 120.

When a session starts, RTP packets from agent device 140 may be received or obtained by recorder 110. When a session starts, e.g., a telephone call is established, capturing unit 215 may receive related data (e.g., RTP packets) and may automatically open a file (or other construct) in storage 220. For example, RTP packets may be automatically forwarded to recorder 110 by a router in network 160. Capturing unit 215 may be configured or adapted to automatically capture, store or record incoming packets, e.g., in a file in storage 220. In an embodiment, capturing unit 215 automatically and autonomously determines a session started and/or ended. In an embodiment, capturing unit 215 automatically and autonomously commences a recording of a session, e.g., capturing unit 215 automatically and autonomously stores RTP packets in storage 220.

For example, capturing unit 215 may determine a session started upon receipt of a first RTP packet after ending or termination of a previous session or call (e.g., a session prior in time to the current session or call). Capturing unit 215 may determine a session started based on a control received. In an embodiment, capturing unit 215 determines a session started based on a control message, e.g., received from agent device 140. In an embodiment, an instance of capturing unit 215 is associated with an agent device 140 and recorder 110 may include a large number such instances respectively associated with a large number of agent devices. For example, in an embodiment, an instance of capturing unit 215 is created for each active agent device. For example, recorder 110 may be a device that includes a controller and capturing unit 215 may be a software module included in recorded 110 and executed by the controller.

A communication channel, e.g., a transmission control protocol (TCP) connection may be established between capturing unit 215 and agent device 140. Accordingly, data packets and control messages, events or signaling (e.g., "off-hook") may be automatically sent from agent device 140 and received by, or provided to, capturing unit 215. Accordingly, recording or capturing a session by capturing unit 215 may be automatically and/or autonomously started or initiated, ended or terminated or performed, even if metadata for the session is unavailable. For example, capturing unit 215 autonomously and/or automatically starts or initiates a recording by opening or creating a file on storage 220 and storing RTP packets in the file when packets arrive from agent device 140.

DB manager 210 and capturing unit 215 may be or may include hardware, firmware, software or any combination thereof. For example, recorder 110 may include hardware designed for real-time operation related to capturing and storing large amounts of data arriving at high speeds. For example, recorder 110 may include a controller for executing DB manager 210 and capturing unit 215 that may be software modules.

Sessions metadata 230, bad sessions metadata 235, previous session metadata 240, current session metadata 245, closed sessions list 250, bad sessions list 255 and open sessions list 260 may be any suitable objects, e.g., objects in a dynamic, run time memory, or objects on a storage device. In place of lists, other data structures (e.g., a table, vector, etc.) may be used. For example, current session metadata 245 may be an object in a dynamic random access memory (RAM) since it may need to be accessed in real-time, while complete sessions metadata 230 may be stored in a file on storage 220. In an embodiment, some or all of: sessions metadata 230, bad/incomplete sessions metadata 235, previous session metadata 240, current session metadata 245, closed sessions list 250, incomplete sessions list 255 and open sessions list 260 are stored in local memory, e.g., a memory included in recorder 110 (e.g., as shown in FIG. 4). As described herein, some of the data stored locally in recorder 110 may be copied or transferred to database 130.

As described herein, a recorder (e.g., recorder 110) including components shown in FIG. 2 may be adapted to record (possibly all) calls regardless of whether or not relevant metadata is received form a controller. In an embodiment, if control or metadata normally received from controller 120 is not received prior to a termination of a session, recorder 110 labels or marks the current or present session (and the related recorded data) as a bad, invalid or incomplete session recording (referred to herein as "bad session"). For example, DB manager 210 labels or marks recorded sessions as bad sessions. In an embodiment, marking a session (and/or related recorded data) as "bad", non-usable, invalid or incomplete includes inserting or adding the session (e.g., by inserting or including a reference to the session or to metadata related to the session) into a list or other data structure, e.g., inserting a session into bad sessions list 255. As further described, in an embodiment, if a bad session terminates, and no metadata was received for the session, recorder 110 copies (or uses) relevant metadata from a previous session in order to complete metadata for the ("current") session.

As described herein, a module or unit may periodically query a list in recorder 110 (e.g., bad sessions list 255) to see if new bad sessions were added to or inserted into the list (e.g., into bad sessions list 255). For example, TRS 121 periodically interacts with recorder 110 and checks a bad sessions list stored on recorder 110.

In an embodiment, if a new bad session is identified, an operational database (e.g., database 130) is updated using metadata generated based on a previous session captured by recorder 110. For example, TRS 121 updates databases 130 based on a bad sessions list. In an embodiment, if a first session (and the related recording) is identified as, or is determined to be, a bad session, metadata associated with a previous session is used in order to update an operational database with respect to the first session.

In an embodiment, when new input data arrives, e.g., a first RTP packet after a session was terminated or following a command or event from agent device 140, a new session is automatically created by a module in recorder 110 by initializing a session structure, e.g., by initializing data in current session metadata 245. Generally, a session structure includes metadata related to a session. A session structure (or a session's metadata structure) may include entries or fields such as one or more status fields, a call identification (call ID), a compound identification (compound ID) and a direction parameter. For example, a status field or parameter may be used to label or mark a session as a "bad" session. Another status field may be used to indicate whether the session is open (e.g., established, ongoing or active) or whether the session is closed. A call ID parameter may be generated by a telephony switch that facilitates the session, a compound ID parameter may be generated and assigned by controller 120. A direction parameter may indicate whether the session is an incoming, outgoing or an internal call (e.g., a call received from a customer, a call made to a customer or a call between a first and second agent in an organization).

Reference is additionally made to FIG. 5 that shows an exemplary session structure. For example, the structure shown in FIG. 5 may be used in order to represent a session and store a representation of the sessions in sessions metadata 230, bad sessions metadata 235. Similarly, current metadata 245 and previous metadata 240 may be or may include a session structure that includes entries as shown in FIG. 5.

Metadata in a session structure (e.g., in current session metadata 245) may include a device identification parameter which identifies agent device 140 (e.g., a device ID), a start and end recording time, a media type parameter identifying the type of media exchanged over the session (e.g., audio, video, data). Metadata in a session structure may include for example an identification of one or more telephony switches through which data related to the session is routed and an identification parameter identifying the agent participating in the session (e.g., the agent operating agent device 140). In an embodiment, current session metadata 245 is created and/or initialized according to the entries in a session structure described herein. Accordingly, when reference to current session metadata 245 (or previous session metadata 240, which may be similar in structure to current session metadata 245) is made, it will be understood that a session structure may be referred to. Other metadata may be used.

In an embodiment, current session metadata 245 includes a status field or entry. A status field may be related to a usability of the related recorded session. For example, a status field or parameter may indicate that the recorded session is a "good" session, e.g., if metadata related to the recorded session was received (e.g., from controller 120). A status field, parameter or value may be related to the usability of a recorded session. For example, if no metadata for the recorded session was received or generated then the session may be considered as incomplete or invalid and therefore, non-usable. As described herein, based on a status entry in a session's structure (or metadata), a reference to the session may be entered into a bad session list 255, e.g., when the session terminates.

When a session starts, e.g., a signal from agent device 140 is received and/or data to be recorded begins to arrive, current session metadata 245 may be initialized. A status field in current session metadata 245 may indicate the session is open. In an embodiment, a status field in initialized current session metadata 245 may indicate the session is bad. For example, at first, a session may be marked as "bad" (or invalid, non-usable or incomplete) and only marked as "good" (or valid, usable or complete) if metadata for the session is available or when metadata for the session is received.

DB manager 210 (or a module therein) may check if a message or update related to the session was received (e.g., from controller 120). For example, messages received from controller 120 may be buffered in recorder 110 and may be handled by DB manager 210. For example, a message from controller 120 may be received (and buffered, e.g., stored in a local memory) by recorder 110 before the first RTP packet of the session arrives, possibly before current session metadata 245 is initialized for the session. Accordingly, after initializing current session metadata 245, DB manager 210 may check whether a message related to the session was received. If no message was received, recording manager may add an entry to open sessions list 260 to indicate the session is open, e.g., in progress or not yet terminated.

In an embodiment, if no message related to the session is received, DB manager 210 marks the session as a "bad" (or invalid or incomplete) session. For example, to mark a session as "bad" or incomplete, an entry in bad sessions list 255 is created. In an embodiment, to mark a session as "bad", a status field in current session metadata 245 is set to a predefined value. For example, the status field described herein may be set to indicate or reflect the associated session is a bad session. Accordingly, at any time after marking a session (and related recorded data) as "bad", DB manager 210 may determine the session is bad, for example, by inspecting metadata related to the session or by inspecting data in incomplete sessions list 255.

In an embodiment, a module such as DB manager 210, or a module or unit therein, checks whether new bad sessions were created. For example, DB manager 210 may examine metadata in sessions metadata 230. If a bad session is detected, it is added or inserted to bad sessions list 255. In an embodiment, DB manager 210 first checks to see if the session is closed (e.g., based on a field in the relevant metadata as described herein). If a session is marked as closed, and as a "bad" session, it is added to bad sessions list 255 and to closed sessions list 250. Periodically or otherwise, bad sessions list 255 may be examined, metadata for sessions in bad sessions list 255 may be generated or processed and database 130 may be updated to include these sessions. Otherwise described, metadata for sessions in bad sessions list 255 may be generated such that these sessions become usable, or god sessions.

In an embodiment, when a message from controller 120 is received, DB manager 210 checks open sessions list 260 to see if the message is related to an open session included or referenced in open sessions list 260. In an embodiment, all sessions list may be examined in order to find the session for which metadata was received. Correlating a message from controller 120 with a session may be based on one or more parameters, e.g., an identification parameter, a time parameter and the like. For example, DB manager 210 may correlate or associate a message including metadata with a session. For example, a message received immediately after one or more RTP packets are received may be associated with the session of the RTP packets. Other parameters or data may be used to associate a metadata or other message with a session. For example, a device number (e.g., an identifier of agent device 140) may be included in a message and used to associate a session with the message. In another example, an IP address of the source device (e.g., agent device 140) may be included in RTP packets and in a message that includes metadata and DB manager 210 uses the IP address in order to associate a session recording with a metadata message.

In an embodiment, if a message received from controller 120 includes metadata related to an open session (e.g., a session included in open sessions list 260), DB manager 210 updates some of the data structures shown in FIG. 2 in order to indicate that the session is no longer a "bad" or incomplete session, rather, the session is now referred to as a "good" or complete session. As discussed, the term "valid session" may refer to a good, usable or complete session as described herein.

In some embodiments, a session for which a recording began may be labeled or marked, by default, as bad e.g., by adding to or inserting a reference to bad sessions list 255 or by updating associated metadata. In such embodiment, if a message received from controller 120 includes metadata related to the session, the session is removed from bad sessions list 255 or is otherwise marked as a good session. It will be noted that additional criteria is typically needed to be met prior to providing metadata to database 130, for example, in an embodiment, the session is required to be closed before relevant metadata is provided to operational database 130.

Accordingly, as described herein, a session may be labeled or marked as a "bad" session if no metadata or other required information is available to recorder 110 when commencing a capture and/or recording of the session. At any time, e.g., while the session is established, ongoing or active, if a message including metadata is received, the status or designation of the session may be changed. For example, when metadata for a session marked as a "bad" or invalid session is received, the session is marked, designated or indicated as a "good", valid or complete session.

In an embodiment, a session is considered or marked as "bad" if it is included, or referenced, in bad sessions list 255 and/or if a status field is set to indicate the session is bad. Similarly, a session may be considered as a "good" or complete session if it is not included in a bad sessions list or based on a status field in associated metadata. Otherwise described, status or designation of a session may be changed by removing a reference to the session from bad sessions list 255. It will be understood that any other method and/or constructs may be used in order to change the status or designation of a session from "bad", incomplete or invalid to "good", valid or complete, when a message is received as described herein. For example, DB manager 210 updates lists shown in FIG. 2 in order to mark a session as a bad session.

In an embodiment, a session structure (e.g., included in current session metadata 245) is initialized using data related to a previous session. For example, previous session metadata 240 may store metadata related to a (or the) previous session handled by capturing unit 215 and data in previous session metadata 240 may be copied to current session metadata 245. For example, required information or metadata normally provided by controller 120 (and missing or unavailable when controller 120 is inoperative or when no message was received from controller 120 as described herein) is copied from the previous session handled by capturing unit 215. For example, parameters such as call identification, switch identification, agent name or reference, agent device identification and the like may be copied from a previous session to the current session. Any information typically provided by controller 120 (and missing for the current session) may be copied from a previous session to the current session.

In an embodiment, a session may only be marked as a "bad" or invalid session if it is closed. In an embodiment, a session is marked or labeled as closed when the session terminates. In an embodiment, closed sessions for which no metadata was received (or is otherwise available to a recorder) are inserted into a bad sessions list or table thus marked as bad sessions. For example, in order to avoid handling bad sessions that are ongoing, only closed or terminated sessions are inserted into the bad sessions list.

Furthermore, metadata may be received after a session has begun but before the session terminates. Accordingly, by only inserting closed sessions into a bad sessions list, an embodiment enables handling bad sessions knowing they have terminated. As referred to herein, a closed session may be a session that has ended or was terminated, e.g., a session (e.g., a telephone call) is marked or labeled as closed if parties to the session have hang up or otherwise terminated the call.

For example, a session may only be added to or inserted into bad sessions list 255 if it is closed, e.g., closed by capturing unit 215. For example, after initializing a session structure for the current session, open sessions list 260 is updated to reflect that the session is active or open. In an embodiment, when determining the session was terminated, closed sessions list 250 is updated to indicate the session has terminated (e.g., a reference to a metadata related to the session is added to closed sessions list 250 and a reference to the session is removed from open sessions list 260).

By marking bad sessions as described herein and completing metadata for bad sessions as described herein, embodiments of the invention may enable maintaining an operational database up to date and avoiding a backlog of sessions to be processed. As known in the art, scanning or examining sessions in off-line in order to identify bad sessions is a heavy task that demands considerable computing resources (and therefore typically performed in off-peak hours). Moreover, off-line or delayed scanning or handling bad sessions (e.g., sessions for which no metadata was available when recorded) prevents an operational database (e.g., database 130) from being up to date or synchronized with current events.

In contrast, by frequently handling sessions in bad sessions list 255, a system or method according to an embodiment of the invention enables keeping an operational database up to date according to a configurable parameter, e.g., the frequency with which bad sessions list 255 is examined.

Assuming controller 120 is operative when a first session is starts but is inoperative when a second session is held, a flow according to embodiments of the invention may be as described below. When the first session starts, a module or unit in recorder 110 (e.g., capturing unit 215) generates a session identification, e.g., a session identification parameter is set to "12345". When the first session starts, current session metadata 245 is initialized (e.g., a structure is created in memory included in recorder 110). Fields, entries or parameters in current session metadata 245 are set or modified based on respective fields in previous session metadata 240. For example, data typically provided by controller 210 is obtained from previous session metadata 240. For example, an identification of a switch from which RTP packets are received (a switch ID), the type of media being carried in the related RTP packets (a media type), a parameter identifying the relevant agent device (a device number or ID), and a parameter identifying the agent handling the session (a user ID) are obtained from previous session metadata 240 and used to set the respective entries in current session metadata 245.

One or more fields in current session metadata 245 may be set to a predefined value that may indicate these fields are incomplete. For example, the interaction identification (interaction ID) and the compound identification (compound ID) entries in current session metadata 245 may be set to zero ("0"). In an embodiment, an InteractionID is an identifier of a customer call or an internal call in that is generated by a system in a contact center and used to identify the call. In an embodiment, a CompoundID is an identifier of a list of calls related to the same call initiator (e.g., incoming/outgoing call, transferred calls, conference calls, consulting calls etc.) related to the same call initiator. For example a customer calls into the call center and talks to a first agent (first call), the call is transferred to a second agent (second call), the second agent puts the customer on hold and consults with supervisor (over a third call). In such case, a system in a contact center may associate a single or same CompoundID with the three calls. It will be understood that parameters such as an InteractionID or CompoundID are described herein in order to exemplify metadata that may be associated with sessions and that other parameters may be used. Accordingly, the scope of the present invention is not limited by the type or other aspects of data included in metadata as referred to herein.

In this example and as described, controller 120 is operative during the first session or call. Accordingly, a message from controller 120 related to the first session is received by recorder 110. Based on the message, DB manager 210 updates current session metadata 245. For example, based on information from controller 120, the compound identification is set to "12345", the switch identification is set to "1", a media type field is set to "voice", the device identification is set to "1234" and the user identification is set to "2". When the session terminates, controller 120 updates database 130 by providing the relevant metadata. Since controller 120 is the source of most of the metadata, it may not use the data stored by recorder 110 as described herein, rather, when operative, controller 120 may use data generated by and/or stored in controller 120 in order to update database 130.

When the first session is terminated, previous session metadata 240 is updated according to current session metadata 245. For example, data in current session metadata 245 may be copied to previous session metadata 240, pointers may be manipulated or memory objects may be renamed. It will be understood that embodiments of the invention are not limited by the method used in order to update or create previous session metadata 240 according to current session metadata 245. It will be understood that embodiments of the invention are not limited by the method used in order to update or create current session metadata 245 according to previous session metadata 240.

In the exemplary scenario described here, controller 120 is inoperative or unavailable during a second session. For example, controller 120 may be inoperative due to a hardware failure, or a problem in network 160. When the second session starts, a module or unit in recorder 110 (e.g., recording manager 210 or capturing unit 215) generates a session identification, e.g., a session identification parameter is set to "12346". Generally, when the second session starts, current session metadata 245 is initialized as described above, e.g., using data in previous session metadata 240. As described, previous session metadata 240 may now include metadata related to the first session. Accordingly, fields, parameters or entries in current session metadata 245 (now associated with the second session) are set based on respective entries in previous session metadata 240. For example, based on the previous session, in the metadata of the current session, the switch identification is set to "1", a media type field is set to "voice", the device identification is set to "1234" and the user identification is set to "2".

When the second session terminates, if no metadata (or message) from controller 120 was received, the session may be marked as "bad", e.g., by setting a session identification field to "0". After the session is closed, DB manager 210 adds to inserts the session into closed session list 250. For example, metadata in current session metadata 245 may be added to sessions metadata 230 and a reference to the metadata is added to or inserted into closed sessions list 250. The session identification (e.g., "12345" for the first sessions and "12346" for the second session) may be used in order to uniquely, or unambiguously, identify a session and its metadata. As further described herein, closed sessions list 250 may be scanned or examined, e.g., periodically and bad sessions in closed sessions list 250 may be processed. For example, processing of bad sessions includes verifying relevant metadata and updating database 130 with related metadata such that the bad sessions are rendered usable.

For example, when a reference to the second session is detected in bad sessions list 255, database 130 is updated to include a session associated with metadata that may be similar to metadata associated with the first session, other than the session identification parameter (or a recording session parameter) that may be "12346" for the second session and "12345" for the first session as described. After updating database 130, lists and other data in recorder 110 may be updated. For example, sessions are removed from bad sessions list 255 after updating database 130. After updating database 130, metadata stored in recorder 110 may be removed. For example, metadata in sessions metadata 230 or bad sessions metadata 235 may be removed when no longer needed. In some embodiments, metadata may be kept, e.g., in order to be used for archiving data related to sessions.

In an embodiment, metadata related to a previous session may be safely used for a current session since, as described herein, capturing unit 215 may be associated with a specific device (or agent). For example, when capturing unit 215 is associated with agent device 140, it may be assumed that the same agent, agent device, media type and other parameters of a current session are the same as those related to a previous session. It will be understood that embodiments of the invention are not limited to a single, or one only current session. For example, an agent using agent device 140 may be simultaneously engaged in two or more calls, for example, using a switch button to switch between calls. When device 140 is engaged in, or associated with, more than one session or call, a respective set of more than one current session metadata 245 instances may be created and maintained by recorder 110. For example, a set of current session metadata 245 instances may be initialized based on previous session metadata 240.

Generally, the lists shown in FIG. 2 are available or accessible to capturing unit 215, DB manager 210 and TRS 121. Accordingly, using the lists shown or using other means, after automatically starting or initiating a recording of a session, capturing unit 215 marks the session as a bad session, or, if metadata for the session is received, marks the recorded session as a good session. Using structures shown, DB manager 210 examines recorded sessions, adds to or inserts a session into a closed sessions list, determines whether or not the session is a bad session, and inserts a bad session into a bad session list. Using lists shown, TRS 121 checks a bad sessions list and updates database 130 based on the bad sessions list.

Figure 3:
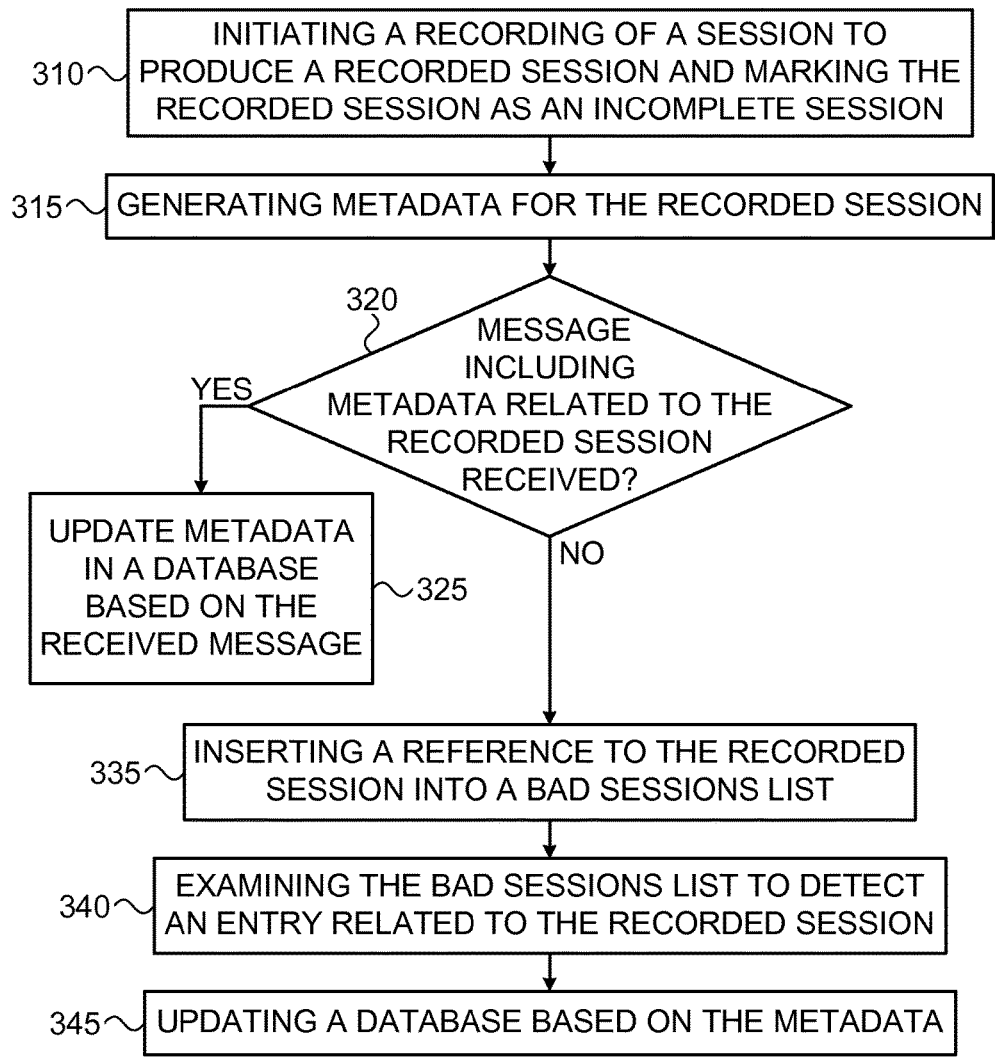
FIG. 3 is a flowchart diagram according to some embodiments of the present invention.

Reference is now made to FIG. 3, a flowchart diagram according to some embodiments of the present invention. As shown by block 310, a method or flow may include initiating a recording of a session to produce a recorded session and annotating, marking or otherwise altering the recorded session as an incomplete or "bad" session. For example, capturing unit 215 included in recorder 110 may automatically commence recording of RTP packets received as input, e.g., as shown by input data 205. A module included in DB manager 210 may open a file on storage 220 and received packets may be stored in the file. In another embodiment, capturing unit 215 may be adapted to receive, and act upon, a (possibly small) set of commands or events. For example, an event such as the picking up of a phone handset (known in the art as "off hook" event) may be received by capturing unit 215, e.g., from agent device 140, and may cause capturing unit 215 to initiate a recording of a session to produce a recorded session on storage 220.

Upon initiating a recording of a session, the recorded session may be annotated, marked or otherwise altered to indicated a "bad" or incomplete session. For example, a session or metadata structure related to the session may be created (e.g., in memory) and fields or entries therein may be set according to information related to a previous session. Reference to the actual data (e.g., the RTP packets) may be included in, or associated with metadata. For example, recorder manager 210 may receive from capturing unit 215 or from a file generator, a reference to a file on storage 220 and add the reference to the metadata.

As shown by block 315, a method or flow may include generating metadata for the recorded session. For example, DB manager 210 (or a module therein) may update current session metadata 245 with metadata. If current session metadata 245 does not exist, DB manager 210 may create it. For example, a structure in memory (e.g., memory 420 included in device 400 may be created). In an embodiment, in order to update or generate metadata for the recorded session (also referred to herein as the current session), metadata from a previous session may be used. For example, in an embodiment, DB manager 210 copies information from previous session metadata 240 into current session metadata 245. Generally, previous session metadata 240 may include metadata related to a previous session recorded by capturing unit 215.

In an embodiment, input data 205 may be received from a specific device, e.g., a specific agent device similar to agent device 140. A system according to embodiments of the invention may include a (possibly very large) number of units that include elements shown in FIG. 2. For example, a plurality of recording or capturing units similar to capturing unit 215 may be deployed and associated with a respective plurality of agent devices. In some embodiments, recording or capturing units similar to capturing unit 215 may be dynamically added or created as required, e.g., by dynamically creating software instances of an application. Each capturing unit 215 may be associated with an agent device.

For example, capturing unit 215 may be associated with agent device 140 by routing packets from agent device 140 to capturing unit 215. Accordingly, with respect to a specific recording unit, a previous session and a current session may be associated with the same device (and agent) and metadata related to a previous session may be assumed to be valid for a current session. A single recording manager (e.g., DB manager 210) may manage a plurality of recording units. For the sake of simplicity, only one capturing unit 215 and only one set of data structures are shown in FIG. 2, however, it will be understood that any number of recording units and data structure sets may be (and typically are) used in an embodiment.

As shown by block 320, a method or flow may include determining whether a message including metadata related to a recorded session was received. For example, a message containing metadata identifying an agent participating in the current session may be received. In another case, a message containing metadata such as a global, or system wide identification parameter identifying the current session may be received. Determining whether a message including metadata related to the recorded session was received may be based on any message that includes metadata related to the current session.

Determining whether a message including metadata related to the recorded session was received may be related to a reception of one or more messages related to the current session. It will be understood that determining whether or not a message including metadata related to a session may be done at any time. For example, in an embodiment, checking or determining if a message including metadata was received is done upon termination of the session, thus allowing the maximal time window for the message to arrive.

As shown by block 325, if a message was received as in block 320, a method or flow may include storing, changing, adding to or updating metadata in a database based on the received message. For example, if a message (e.g., from controller 120) that includes metadata related to the current session is received then current session metadata 245 may be updated according to information in the message.

Upon termination of the session (e.g., when an event signaling that agent device 140 has terminated a call) metadata from current session metadata 245 may be copied or moved to sessions metadata 230 and a reference to the metadata in session metadata 245 may be added to one or more lists. At a later stage, lists may be examined and used to update database 130, e.g., as described herein. For example, metadata from sessions metadata 230 may be copied or provided to database 130 only for those sessions which are referenced in closed sessions list 250.

As shown by block 335, if a message was not received as in block 320, a method or flow may include inserting a reference or link to the recorded session into a bad sessions list. For example, if no message including metadata related to the current session is received or available, DB manager 210 inserts a reference to the current session into bad sessions list 255. As described herein, bad sessions list 255 may be used in order to identify sessions (and recordings) that need to be handled, e.g., as described herein.

As shown by block 340, a method or flow may include examining a list to detect an entry related a recorded session. For example, a module or unit in DB manager 210 may, periodically, check bad sessions list 255 in order to determine whether recorded sessions for which metadata was not received from controller 120 are present. In an embodiment, DB manager 210 may only handle recorded sessions that were terminated by first examining closed sessions list 250.

As shown by block 345, a method or flow may include updating a database based on metadata generated and maintained by a recorder. For example, as described herein, metadata for sessions may be stored in sessions metadata 230. In an embodiment, a plurality of metadata objects may be stored in sessions metadata 230. In an embodiment, DB manager 210 periodically (or otherwise) checks for bad sessions, e.g., by examining bad sessions list 255 and verifying the sessions included in bad sessions list 255 have terminated, by examining closed sessions list 250. In an embodiment, if a session in bad sessions list 255 is marked or annotated as closed, e.g., by being referenced in closed sessions list 250, DB manager 210 copies, send or other provides metadata related to the session (as stored in incomplete sessions metadata 235) to database 130.

In some embodiments, reference to a session (and the data recorded for the session, e.g., a file containing RTP packets) may be inserted into open sessions list 260. For example, recording manager may insert a reference to a session recording (or a recorded session) into open sessions list 260 when recording of the session starts, thus, sessions that are currently recorded (e.g., sessions currently in progress) can be quickly identified. When a session is terminated, a reference to the session in open sessions list 260 may be removed. Such configuration may enable refraining from updating database 130 with metadata related to sessions which are not yet terminated (or closed). By keeping a reference to a session in open sessions list 260, DB manager 210 can quickly handle a message including metadata (e.g., from controller 120) received at any time while the session is in progress. For example, when a message is received from controller 120, DB manager 210 may check open sessions list 260 and quickly determine if the message is related to an ongoing (open) session.

Reference is made to FIG. 4, showing high level block diagram of an exemplary computing device according to embodiments of the present invention. Computing device 400 may include a controller 405 that may be, for example, a central processing unit processor (CPU), a chip or any suitable computing or computational device, an operating system 415, a memory 420, a storage 430, n input devices 435 and n output devices 440. Components in the system shown in FIG. 1 may be, or may include components included in, device 400. For example, recorder 110 may include a controller 405, memory 420, storage 430 and executable code 425. For example, DB manager 210 may be implemented using executable code 425.

Operating system 415 may be or may include any code segment designed and/or configured to perform tasks involving coordination, scheduling, arbitration, supervising, controlling or otherwise managing operation of computing device 400, for example, scheduling execution of programs. Operating system 415 may be a commercial operating system.

Memory 420 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 may be or may include a plurality of, possibly different memory units.

Executable code 425 may be any executable code, e.g., an application, a program, a process, task or script. Executable code 425 may be executed by controller 405 possibly under control of operating system 415. For example, executable code 425 may be an application that executes or performs operations, flows and methods as described with reference to DB manager 210. Executable code 425 may include a plurality of modules or units. Thus, controller 405 may be configured to carry out embodiments of the invention. The various modules and devices, e.g., recorders, controller 120, etc., may each carry out all or part of embodiments of the invention, and multiple controllers 405, each in a different device, may be configured to carry out part of the invention.

For example, recorder 110, database 130 and controller 120 may each be a device similar to device 400 or may include components included in device 400, e.g., recorder 110 and controller 120 may include one or more controllers similar to controller 405 and a memory similar to memory 420. A TRS module and/or a DB manager 210 module described herein may be implemented or realized using executable code similar to executable code 425. For example, the TRS and DB manager 210 modules may be programs or other executable code executed by controller 405. Storage connected to recorder 110 and/or database 130 may be similar to storage 430.

Where applicable, executable code 425 may carry out operations described herein in real-time. Computing device 400 and executable code 425 may be configured to update, process and/or act upon information at the same rate the information, or a relevant event, are received. For example, recording a session and generating metadata for a recorded session as described herein may be performed in real-time. In some embodiments, more than one computing device 400 may be used. For example, a plurality of computing devices that include components similar to those included in computing device 400 may be connected to a network and used as a system. For example, recording of sessions and completing metadata for recorded sessions may be performed, in real-time, by executable code 425 when executed on one or more computing devices such computing device 400.

Storage 430 may be or may include, for example, a hard disk drive, a CD-Recordable (CD-R) drive, a universal serial bus (USB) device or other suitable removable and/or fixed storage unit. Content may be stored in storage 430 and may be loaded from storage 430 into memory 420 where it may be processed by controller 405. In some embodiments, some of the components shown in FIG. 4 may be omitted. For example, memory 420 may be a non-volatile memory having the storage capacity of storage 430. Accordingly, although shown as a separate component, storage 430 may be embedded or included in memory 420.

Input devices 435 may be or may include a mouse, a keyboard, a touch screen or pad or any suitable input device. It will be recognized that any suitable number of input devices may be operatively connected to computing device 400 as shown by block 435. Output devices 440 may include one or more displays, speakers and/or any other suitable output devices. It will be recognized that any suitable number of output devices may be operatively connected to computing device 400 as shown by block 440. Any applicable input/output (I/O) devices may be connected to computing device 400 as shown by blocks 435 and 440. For example, a wired or wireless network interface card (NIC), a modem, a universal serial bus (USB) device or external hard drive may be included in input devices 435 and/or output devices 440.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 420, computer-executable instructions such as executable code 425 and a controller such as controller 405.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Reference is now made to FIG. 6, a diagram of an exemplary flow according to embodiments of the present invention. As shown by block 610, a capture unit (that may be a capture unit 215 included in recorder 110) is configured to sniff and record all packets of a call regardless of whether or not a command from a controller (e.g., controller 120) was received. For example, when controller 120 is down, inoperative or otherwise unavailable, a capture unit in recorder 110 will not receive updates from the controller, e.g., metadata information related to a current session.

As shown by 620, if no metadata for a session is available, relevant metadata from a previous session is used. As further shown, the session is annotated or marked as a bad session. In an embodiment, bad sessions are kept in a recorder's or logger's internal storage. As shown by 630, periodically (e.g., once in several minutes), a module (e.g., TRS 121) queries a bad session list to see if new bad sessions were inserted into the local logger's storage. If, when or upon detecting a new bad session, the module updates an operational database (e.g., operational database 130 is updated with metadata of the bad sessions as generated by the recorder or logger). For example, TRS 121 included in controller 120 periodically check a bad sessions list stored in a memory installed in recorder 110 (e.g., bad sessions list 255) and updates database 130 based on the bad sessions list.

Figure 7A:
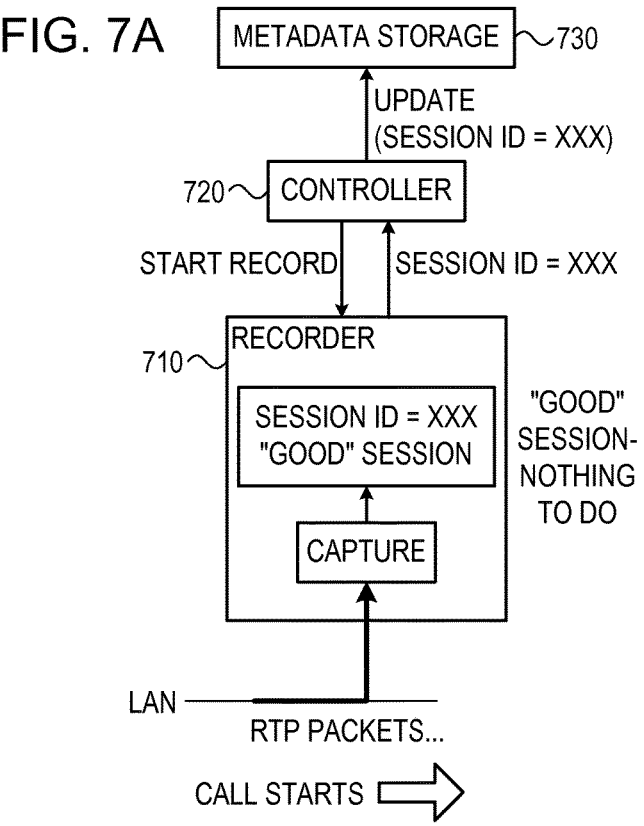
FIG. 7A is a diagram of an exemplary flow according to embodiments of the present invention.
Figure 7B:
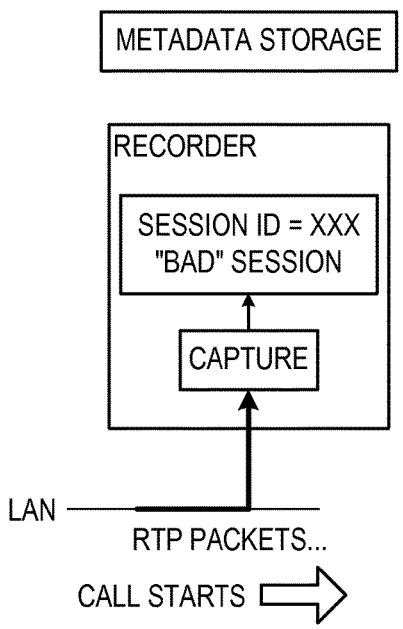
FIG. 7B is a diagram of an exemplary flow according to embodiments of the present invention.
Figure 7C:
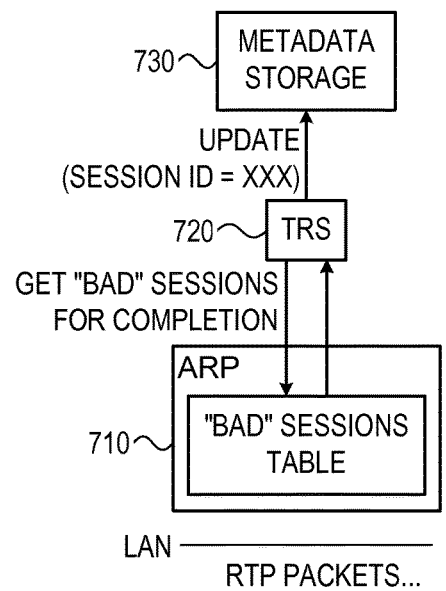
FIG. 7C is a diagram of an exemplary flow according to embodiments of the present invention.

Reference is now made to FIGS. 7A, 7B and 7C that show an exemplary flow according to embodiments of the present invention. As shown by FIG. 7A, in a "clear day" scenario, namely, when controller 720 (that may be similar to controller 120 described herein) is available, it sends an update command to the capture unit included in a recorder 710.

For example, recorder 710 may be similar to recorder 110 and may include any components included in recorder 110 as described herein, e.g., with reference to FIG. 2. As shown, recorder 710 includes a capture unit configured to automatically commence a recording upon arrival of data (e.g., RTP packets on a LAN as shown) or upon receiving a command from controller 720. In an embodiment, recorder 710 includes a file generator that generates a file (e.g., on storage 220) for storing captured RTP packets. As shown, based on a command received from controller 720 (that may be similar to controller 120), a session ID for the session is set and session is marked as a good session. Other metadata from controller 720 may also be set for the session.

As shown, session ID is reported to controller 720 and a module in controller 720 updates metadata storage 730. For example, metadata storage 730 may be, or may be included in, operational database 130. In the scenario shown in FIG. 7C, sessions are marked as "good" sessions since metadata for these sessions is available, and a bad sessions list or table may therefore be empty.

As shown by FIG. 7B, in a "rainy day" scenario, namely, when controller 720 is unavailable, no update commands arrive at, or are received by, the capture unit in recorder 710. In this case, opened sessions are marked as "bad" sessions and are inserted into a bad sessions list or table, e.g., bad sessions list 255. For example and as shown, a file generator may associate a session with a session ID that indicates the session is a bad session.

As shown by FIG. 7C, a module or unit (e.g., TRS 121) included in controller 720 queries the bad sessions table on recorder 710 and gets all sessions therein. For example, TRS 121 may periodically (e.g., every three minutes) query the bad sessions list or table 255. For each session in the bad sessions list, TRS 121 generates an interaction object, e.g., a structure similar to session structure shown in FIG. 5 and updates metadata storage 730 such that the bad sessions are included in metadata data storage 730 and may therefore become usable.

Figure 8:
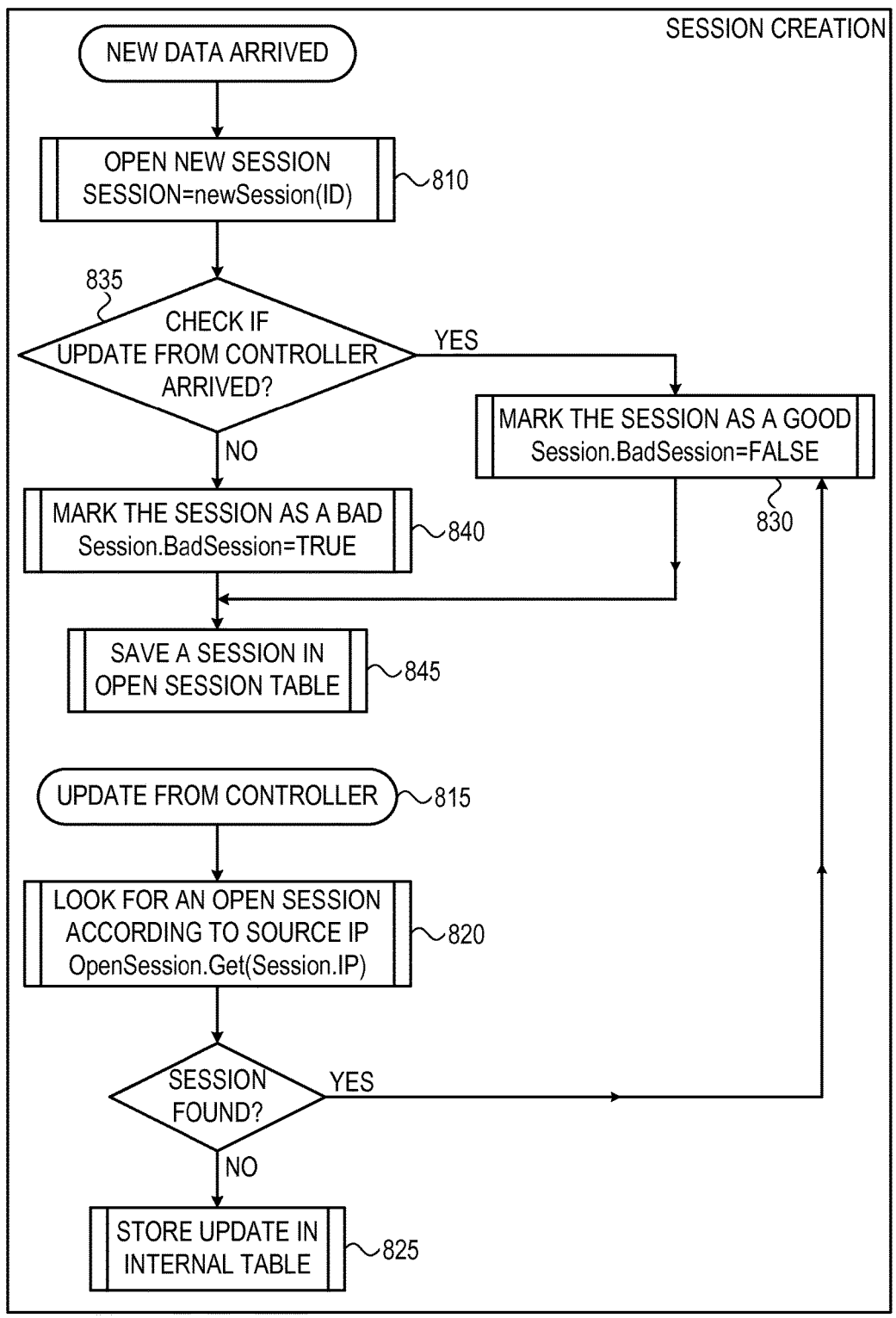
FIG. 8 is a diagram of an exemplary flow according to embodiments of the present invention.

Reference is now made to FIG. 8, an exemplary flow according to embodiments of the present invention. The flow shown in FIG. 8 and described herein may be related to generating or creating a recorded session by a capture unit that may or may not receive related metadata or commands from a controller. As shown by 810, upon arrival of new data (e.g., RTP packets carrying data related to a session or call), a capture unit automatically and/or autonomously starts recording the session, e.g., as described herein. As shown 815, the capture units create a new bad session since no data related to the session was received from a controller. For example, neither a command to start recording a session nor metadata related to the session are received by from or on the first arrived packet regardless of the controller commands. As shown, update from a controller may be received by the capture unit or recorder. As shown by 820, the capture unit may search for a recording of a session that matches data in the update message. As shown by 825, if no matching session is found or received, the update may be stored locally on the capture unit or recorder. Stored messages received from a controller may be periodically or otherwise processed. For example, a capture unit may periodically process messages received from a controller and attempt to match them with recorded sessions. Accordingly, even if a recording is started by a capture unit when no data is available from a controller, or data from a controller is received before a recording was started, data received from a controller may be matched or associated with recorded data.

As shown by 830, if data in a message received from a controller is matched with a session or found (e.g., based on a source IP address of an agent device related to the session), the session is marked or noted as a good session, e.g., by updating metadata related to the session or by updating a list or table as described herein. As shown by 835, after opening a session as shown by 810, a capture unit checks to see if updates or commands related to the session have been received. As described, if a session autonomously opened or initiated by a capturing unit (e.g., as shown by 810) can later be matched with metadata or other information received from a controller then the related session is marked as a good session.

As shown by 840, if no data related to the session is received from a controller, the capture unit marks the session as a bad session. As shown by 845, the session may also be entered into a list or table of open sessions, e.g., as described herein. In addition, the capture unit copies information from a previous related session to a structure representing the current session. For example, fields such as userId, DeviceNumber, SwitchId as shown in FIG. 5 and described herein are copied from a previous session. In an example, the InteractionID field is not copied, rather, this field is used to indicate a bad session, e.g., by setting this field to a predefined value, e.g., zero ("0"). When a recording of the session ends (e.g., by sensing a predefined period during which no RTP packets arrive), a file generator unit described herein closes the session and updates the open session table to reflect the session is no longer open, e.g., the file generator unit removes the session from the open sessions list or table.

Figures 9, 10:
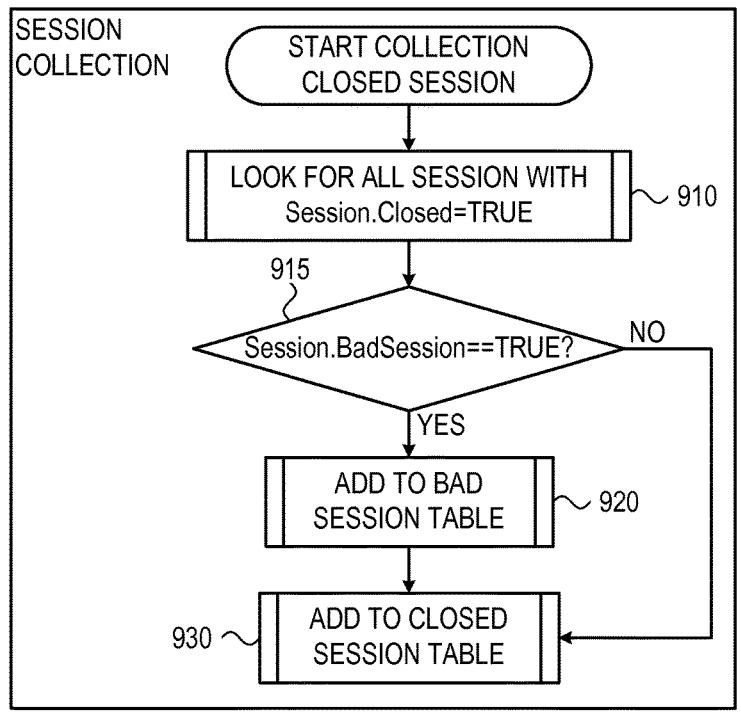
FIG. 9 is a diagram of an exemplary flow according to embodiments of the present invention.
FIG. 10 is a diagram of an exemplary flow according to embodiments of the present invention.

Reference is now made to FIG. 9, an exemplary flow of session collection according to embodiments of the present invention. The flow shown in FIG. 9 and described herein may be performed by a database manager unit. In an embodiment, a database management unit may be installed on a controller, e.g., controller 120. Generally, the flow shown in FIG. 9 may include session collection of sessions stored on a capture unit. As shown by 910, closed sessions may be searched for in a list. For example, using a list or table, sessions metadata described herein may be examined in order to determine whether they are currently opened or are already closed. For example, a DBManager module or unit described herein, searches an open sessions list or table described herein and identifies closed sessions by examining sessions' metadata of sessions in an open session list or table stored on recorder 710. For example, in an embodiment, an open sessions table contains metadata related to open calls and calls or interactions that were recently terminated or closed. Once a DBManager (e.g., DB manager 210 or a module therein) detects a closed or terminated session in the open sessions table, it moves the relevant metadata to a closed sessions table or list.

As shown by 915, if a session is closed, it may be further determined whether (or not) the session is marked as a bad session. For example, a session may be marked as a bad session as described and shown by 840 and FIG. 8. Therefore, it may subsequently be determined if a session is a bad session as shown by 915. As shown by 920, sessions identified as bad sessions are inserted into a bad sessions list. For example, a DBManager module inserts a bad session into a bad session table on recorder 710. For example, if a session's metadata contains an InteractionID set to zero ("0") then the DBManager module determines the session is a bad session and, in such case, further copies the value of the session ID field into the interaction ID field. As shown by 930, bad and good sessions are added to a closed sessions list, e.g., by the DBManager module.

Reference is now made to FIG. 10, an exemplary flow of bad sessions collection according to embodiments of the present invention. In an embodiment, a TRS module included in a controller may perform the method shown in FIG. 10 and described herein. As shown by 1110 a bad sessions table is examined. For example, using the ERS module as shown in FIG. 7C, TRS queries bad sessions list 255 on recorder 710 once every several minutes to see if new bad sessions were inserted into the bad session table. As shown by 1120, a session is extracted from the list and, as shown by 1130, if the session ID field is not set to NULL or zero ("0"), then it is determined the session is a good session and needs not be processed further. As shown by 1140, if the session is a bad session, the TRS module creates a representation of an interaction. For example, an interaction representation is created the same way an operative controller would. For example, any field missing in metadata related to the currently processed session may be completed by the TRS module such that a representation of an interaction or session may be produced. As shown by 1150, interactions (or representations of interactions) produced are stored in or added to a database. For example, an operational database such as database 130 is updated to include representations of interactions produced based on bad sessions processed as described. After updating a database to include a representation of a bad session, the bad session may be removed from the bad sessions list or table.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of recording audio communication sessions carried over a network, the method comprising:
    recording, by a recorder, in real time, audio data related to a contact center audio communication session between an agent and a customer to produce a recorded session, the recording being initiated by the recorder;
    identifying, by the recorder, the recorded session as an incomplete session, for which metadata associated with and describing the audio data and the audio communication session was not received at the recorder from a controller external to the recorder;
    inserting, by the recorder, into a list of incomplete sessions held by the recorder, a reference to the recorded session;
    generating, by the recorder, using metadata from a previous session including at least agent information, metadata related to the recorded session and using the metadata to complete the metadata for the recorded session, wherein the previous session is a session which preceded the recorded session;
    examining, by the controller, periodically or when a connection is established between the controller and recorder, the list of incomplete sessions to detect an entry related to the recorded session;
    if data in a message received from the controller is matched with the recorded session, updating, by the recorder, the metadata of the recorded session; and
    storing, by the controller, in a metadata database, the metadata related to the recorded audio session.

2. The method of claim 1, wherein generating the metadata for the recorded session based on the metadata associated with the previous session is performed if a device associated with the previous session is associated with the recorded session.

3. The method of claim 1, wherein storing metadata related to recorded sessions appearing in the list in the metadata database is performed periodically.

4. The method of claim 1, comprising:
    upon termination of the audio communication session, marking, by the recorder, the session as closed, wherein the controller is configured to store in the metadata database, only metadata for sessions marked as closed.

5. The method of claim 1, wherein generating-the metadata related to the recorded session comprises generating an incomplete metadata object for the recorded session and generating the metadata for storing in the metadata database based on the incomplete metadata object.

6. A system comprising:
    a recorder having a database manager and a capturing unit for recording, in real time, audio data of contact center audio communication sessions between agents and customers as audio sessions;
    a metadata database for storing metadata associated with the recorded sessions; and
    a controller external to the recorder,
    wherein the capturing unit is configured to initiate a recording of an audio communication session to produce a recorded session;
    wherein the database manager is configured to:
    identify the recorded session as an incomplete session, if metadata associated with and describing the audio data and the audio communication session was not received at the recorder from the controller,
    insert, by the recorder, into a list of incomplete sessions a reference to the recorded session upon termination of the session; and
    generate, using metadata from a previous session including at least agent information, metadata related to the recorded session and using the metadata to complete the metadata for the recorded session, wherein the previous session is a session which preceded the recorded session,
    wherein the controller is configured to:
    examine the list of incomplete sessions to detect an entry related to the recorded session;
    if data in a message received from the controller is matched with the recorded session, update the metadata of the recorded session; and
    store in the metadata database the metadata related to the session.

7. The system of claim 6, wherein the database manager is configured to generate the metadata for the recorded session based on the metadata associated with the previous session if a device associated with the previous session is associated with the recorded session.

8. The system of claim 6, wherein the controller is configured to periodically store the metadata generated by the recorder and related to recorded sessions appearing in the list in the metadata database.

9. The system of claim 6, wherein the controller is configured to store in the metadata database, only metadata for sessions marked as closed.

10. The system of claim 6, wherein the system is integrated in a call center environment and the audio communication session is a telephone call.

11. The method of claim 1, wherein the metadata related to the recorded session comprises computer telephony integration (CTI) data.

12. The method of claim 1, wherein the method is implemented in a call center environment.

13. The method of claim 1 comprising:
marking, by the recorder, the recorded session as an incomplete session; and
if a message including the metadata related to the audio communication session is received from the controller, changing the marking of the recorded session to a complete session.

14. The method of claim 1 comprising:
automatically marking all recorded sessions as incomplete sessions and changing the marking of any of the sessions to a complete session only if metadata for the session is received by the recorder.

15. The method of claim 1 wherein the recorded session is a new session.

16. The method of claim 1 wherein inserting into a list of incomplete sessions held by the recorder, a reference to the recorded session occurs only if the recorded session closed.

17. The method of claim 1 wherein the examining, by the controller, the list of incomplete sessions is performed periodically and comprises determining if new bad sessions were inserted in the list.

* * * * *